United States Patent
Guzman et al.

(10) Patent No.: US 12,498,775 B2
(45) Date of Patent: Dec. 16, 2025

(54) ATTACHMENT COMPONENTS AND METHODS FOR DATA PROCESSING SYSTEMS

(71) Applicant: Dell Products L.P., Round Rock, TX (US)

(72) Inventors: Richard William Guzman, Lago Vista, TX (US); Eric Thomas Graham, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/676,388

(22) Filed: May 28, 2024

(65) Prior Publication Data

US 2025/0370517 A1    Dec. 4, 2025

(51) Int. Cl.
| | |
|---|---|
| *G06F 1/16* | (2006.01) |
| *G06F 1/20* | (2006.01) |
| *H05K 5/00* | (2025.01) |
| *H05K 7/00* | (2006.01) |
| *H05K 7/20* | (2006.01) |

(52) U.S. Cl.
CPC ........... *G06F 1/20* (2013.01); *H05K 7/20136* (2013.01)

(58) Field of Classification Search
CPC ........... G06F 1/20; G06F 1/203; G06F 1/206; H05K 7/20136; H05K 7/20; H05K 7/20009; H05K 7/20145; H05K 7/20163; H05K 7/20172; H05K 7/20181; H05K 7/2019
See application file for complete search history.

(56) References Cited

U.S. PATENT DOCUMENTS

| | | | |
|---|---|---|---|
| 6,403,879 B1* | 6/2002 | Clements | H05K 9/0041 174/370 |
| 9,579,006 B1* | 2/2017 | Kirkpatrick | A47L 9/0633 |
| 2008/0233858 A1* | 9/2008 | Womac | H05K 7/18 454/184 |
| 2009/0143003 A1* | 6/2009 | Roesch | H05K 5/03 454/256 |
| 2014/0167578 A1* | 6/2014 | Lesser | H05K 7/1489 312/223.5 |
| 2016/0270262 A1* | 9/2016 | Crawford | H04L 41/0803 |
| 2016/0338220 A1* | 11/2016 | Crawford | H05K 7/20745 |
| 2024/0138097 A1* | 4/2024 | Tunks | H05K 7/20136 |
| 2024/0138101 A1* | 4/2024 | Chen | H05K 7/20172 |
| 2024/0138102 A1* | 4/2024 | Huang | H05K 7/20172 |
| 2024/0256015 A1* | 8/2024 | Hartman | H05K 7/20172 |
| 2025/0142756 A1* | 5/2025 | O'Donnell | H05K 7/1402 |
| 2025/0142758 A1* | 5/2025 | Kuan | H05K 5/0208 |

* cited by examiner

*Primary Examiner* — Anthony M Haughton
(74) *Attorney, Agent, or Firm* — WOMBLE BOND DICKINSON (US) LLP

(57) ABSTRACT

A data processing system is provided. The data processing system may include hardware components that are adapted to provide computer implemented services and positioned in a chassis. The data processing system may also include a chassis. The chassis may include a ventilation portion and a functional portion. The ventilation portion may include ventilation holes to facilitate circulation of gasses through an interior of the chassis. The ventilation portion may also include cover elements positioned with the plurality of ventilation holes to at least partially cover the plurality of ventilation holes. The functional portion may include attachment elements to reversibly secure the functional portion to the ventilation portion and align a portion of the functional portion with the ventilation portion.

20 Claims, 12 Drawing Sheets

ATTACHMENT COMPONENTS AND METHODS FOR DATA PROCESSING SYSTEMS

FIELD OF THE DISCLOSURE

Embodiments disclosed herein generally relate to data processing systems. More particularly, embodiments disclosed herein relate to chassis for data processing systems.

BACKGROUND

Computing devices may provide various types of computer implemented services. To provide the computer-implemented services, computing devices may include various type of hardware devices such as, for example, processors, memory modules, and storage devices. These hardware components may need to be positioned with one another to provide their respective functions. Similarly, various components devices may be aggregated together to form a computing system.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
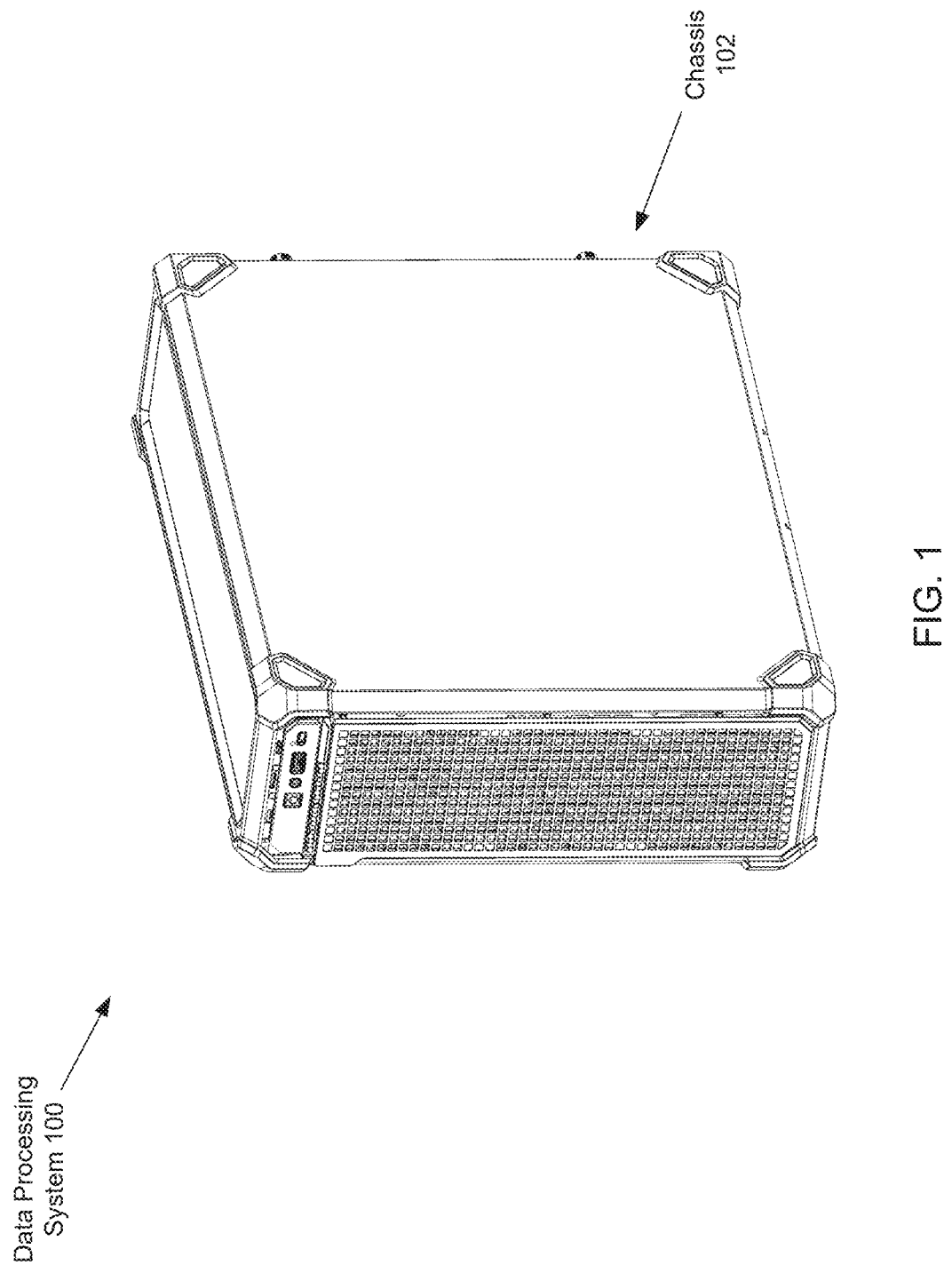
FIG. 1 shows a diagram illustrating a data processing system in accordance with an embodiment.

Various embodiments will be described with reference to details discussed below, and the accompanying drawings will illustrate the various embodiments. The following description and drawings are illustrative of the embodiment disclosed herein and are not to be construed as limiting the disclosed embodiments. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrases "in one embodiment", "an embodiment", and similar recitations in various places in the specification do not necessarily all refer to the same embodiment.

In general, embodiments disclosed herein relate to systems and methods for providing computer implemented services. To provide computer implemented services, data processing systems may include hardware components. The hardware components may consume power, provide the computer implemented services using the power, and may generate waste heat.

To manage the waste heat, the data processing system may include a ventilation portion. The ventilation component may enable gasses to circulate through a chassis of the data processing system. To do so, the ventilation component may include various holes that facilitate gas flow.

To manage the gas flows, the data processing system may include functional portions. The functional portions may be adapted to physically connect to the ventilation portion. When so connected, the functional portions may provide a variety of functions. For example, some functional portions may include filtration media. The filtration media may filter the gas flows through the chassis to reduce buildup of undesired materials within the chassis.

To attach to the ventilation portions, the functional portions may include attachment elements. The attachment elements may be adapted, for example, to be partially inserted into portions of the ventilation portions that support the gas flows. Once inserted, various interferences between the attachment elements and the ventilation portion may prevent removal of the functional portions.

In addition to filtration functionality, the functional portions may provide other types of functionalities. For example, the functional portions may include displays for conveying information, tags, and/or other structures. Consequently, the functionality of data processing system may be customized based on its environment and/or desired functionalities through attachment of functional portions to the ventilation portions.

Thus, embodiments disclosed herein may provide various benefits.

In an embodiment, a data processing system is provided. The data processing system may include hardware components that are adapted to provide computer implemented services and positioned in a chassis; the chassis comprising: a ventilation portion comprising: a plurality of ventilation holes to facilitate circulation of gasses through an interior of the chassis; and a plurality of cover elements positioned with the plurality of ventilation holes to at least partially cover the plurality of ventilation holes; and a functional portion including: a plurality of attachment elements adapted to: reversibly secure the functional portion to the ventilation portion; and align a portion of the functional portion with the ventilation portion.

An attachment element of the plurality of attachment elements may be adapted to establish an interference with at least one cover element of the plurality of cover elements during a securement of the functional portion to the ventilation portion.

The functional portion may also include a plurality of holes corresponding to the plurality of ventilation holes; and filtration media positioned with the plurality of holes.

While the functional portion is secured to the ventilation portion, the filtration media may filter flows of gasses through the plurality of ventilation holes.

While the functional portion is secured to the ventilation portion, the plurality of holes may be offset from the plurality of ventilation holes with respect to airflow paths that the flows of gasses take when pathing through the ventilation holes.

The functional portion may also include a plate in which the plurality of holes is positioned. The plurality of attachment elements may be attached to the plate.

While the functional portion is secured to the ventilation portion, the plurality of attachment elements may close a portion of the plurality of ventilation holes.

While the functional portion is secured to the ventilation portion, the plurality of attachment elements may create interferences with a portion of the plurality of cover elements, the interferences may prevent detachment of the functional portion of the ventilation portion without deformation of the plurality of attachment elements.

A cover element of the cover elements may include a cover member, and an offset member that separates the cover member from a corresponding ventilation hole of the plurality of ventilation holes.

The ventilation portion may also include a plate in which the plurality of ventilation holes is positioned. The offset member may be attached to the plate.

The offset member may be aligned with the corresponding ventilation hole by the cover member so that the ventilation hole is not visible at normal incidence to the plate.

The offset member may be separated from the plate by a distance defined by the offset member to enable gasses to flow around the cover member while flowing through a flow path through the ventilation hole.

The functional portion may also include a receptacle.

The functional portion may further include a display positioned in the receptacle and operably connected to the hardware components.

The functional portion may also include a tag, positioned in the receptacle, for managing the data processing system.

In an embodiment, a chassis as discussed above is provided.

In an embodiment, a method of assembling a data processing system is provided.

In an embodiment, a method of disassembling a data processing system is provided.

Turning to FIG. 1, a diagram illustrating data processing system 100 in accordance with an embodiment is shown. Data processing system 100 may be used to provide various computer implemented services.

To provide the computer implemented services, data processing system 100 may include a chassis (e.g., 102) and various hardware components (e.g., 104, FIG. 2) positioned therein. The hardware component may include, for example, processors, memory modules, storage devices, special purposes computer devices (e.g., graphics/data processing units), and/or other components.

During operation of the hardware components, power may be consumed and heat may be generated as a byproduct of operation of the hardware components. The hardware components may include various limits on their operating environment such as temperature limits. Consequently, if the temperature of the hardware components exceeds this example prescribed limit, then the hardware components may not operate as desired. For example, the hardware components may exhibit errors during operation, may not be able to operate at normal rates, may entirely fail to operate, etc.

In general, embodiments disclosed herein relates systems, methods, and devices for providing computer implemented services. To provide the computer implemented services, data processing systems may include ventilation portions that enable gasses to flow through chassis. The flows of gasses may be used, for example, to regulate the temperatures of hardware components positioned within the chassis.

The ventilation portions may be structure in a manner that enables a variety of other types of portions to be reversibly secured to the ventilation portions. For example, the ventilation portions may include various structure to which the other types of portions may reversibly secure themselves. To do so, the variety of other types of portions may include attachment elements. The attachment elements may establish interferences with the filtration portions that fix the other types of portions to the ventilation portion.

While attached, the other types of portions may perform various functions such as, for example, filtering flows of gasses through the ventilation portion, enabling tracking of data processing systems using tags, displaying information as set by the hardware components, etc.

While illustrated in FIG. 1 with respect to a desktop chassis style, it will be appreciated that other chassis styles (e.g., rack unit compatible, such as 1 U/2 U racks) may be utilized without departing from embodiments disclosed herein.

While illustrated in FIG. 1 with respect to a limited number of specific components in specific positions and orientations, a data processing system may include different number and/or types of components with different positions and/or orientations without departing from embodiments disclosed herein.

Figure 2:
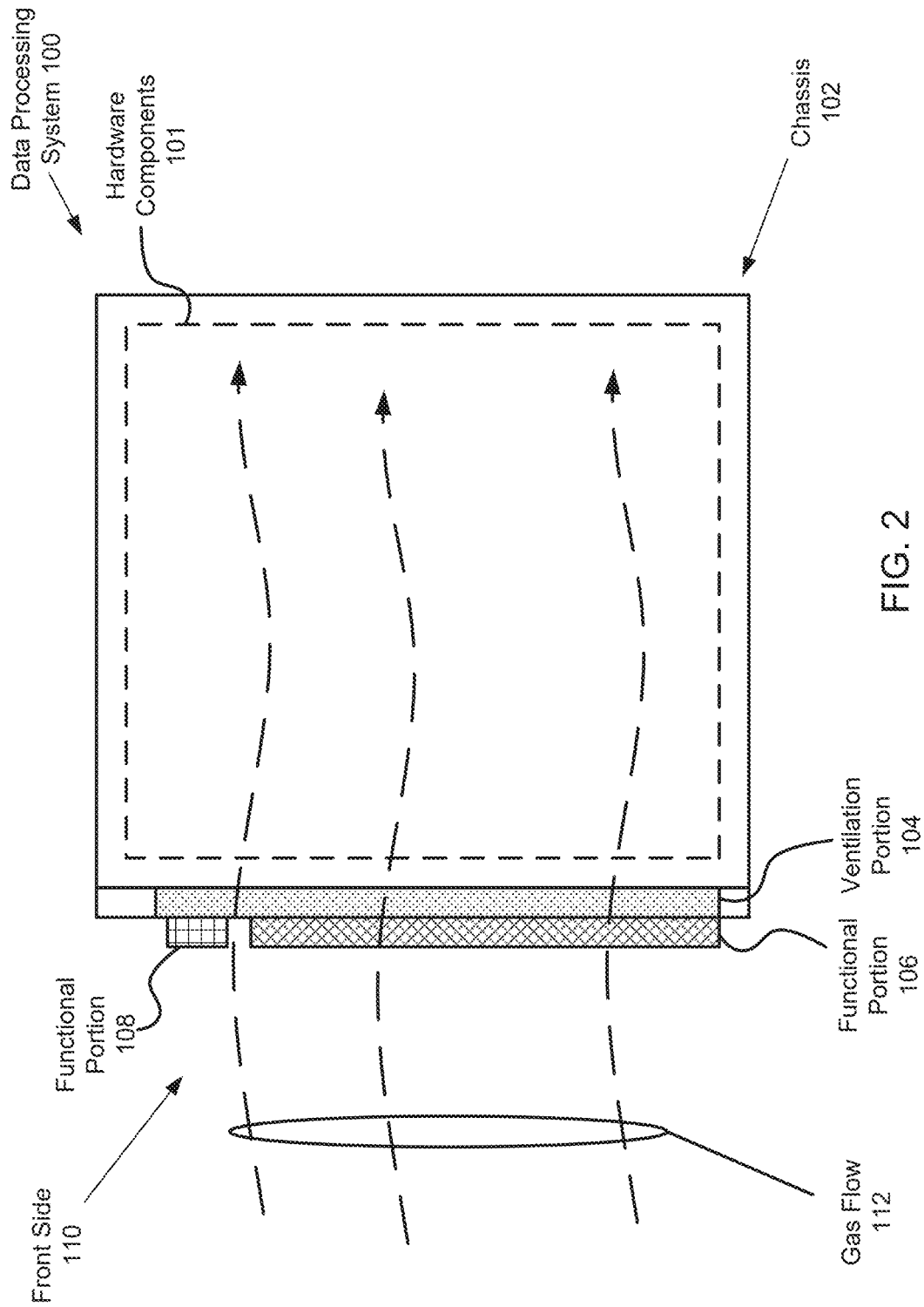
FIG. 2 shows a side view diagram illustrating a data processing system in accordance with an embodiment.

Turning to FIG. 2, a side view diagram of data processing system 100 in accordance with an embodiment is shown. As seen in FIG. 2, various hardware components 101 may be positioned in an interior of chassis 102. In FIG. 2, these example hardware components are illustrated with a block having a dashed outline to indicate that the shape/structure of the hardware components may be of any type.

Figure 3:
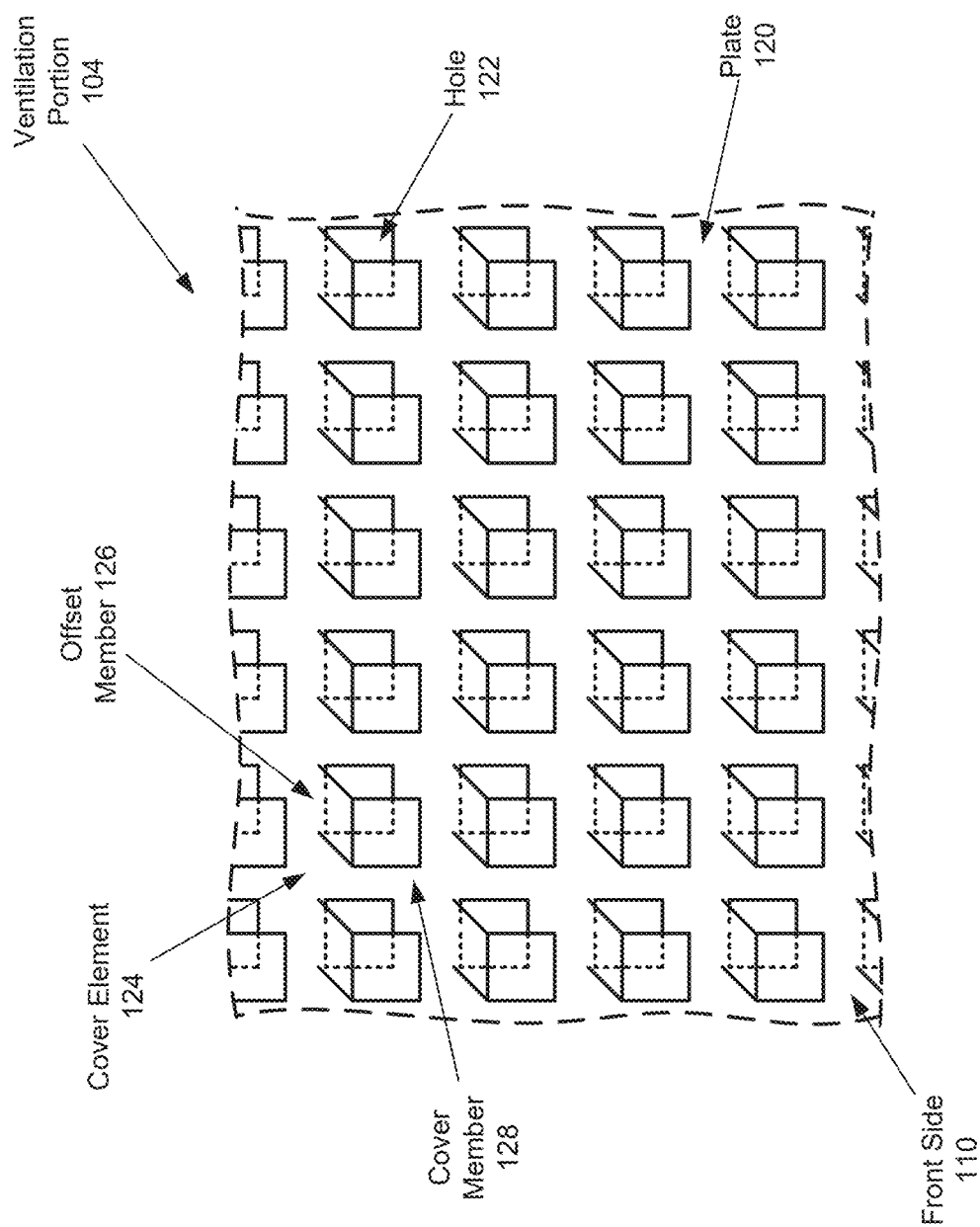
FIG. 3 shows a front view diagram illustrating a portion of a ventilation portion of a data processing system in accordance with an embodiment.
Figure 4:
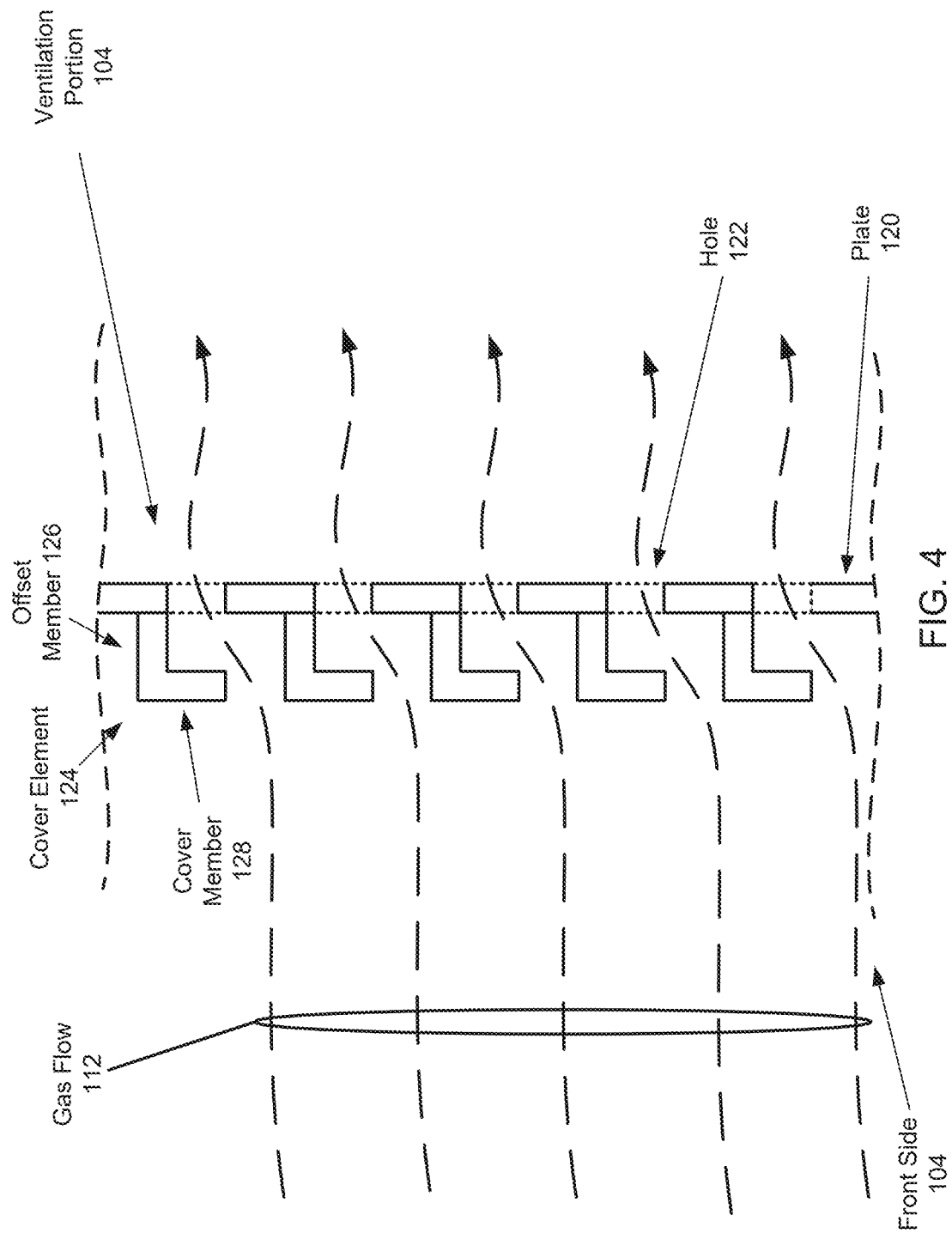
FIG. 4 shows a side view diagram illustrating a portion of a ventilation portion of a data processing system in accordance with an embodiment.

To manage the hardware components, chassis 102 may include and/or be connected to ventilation portion 104. Ventilation portion 104 may be a portion of a wall or other structure member of chassis 102 (other portions of chassis 102 may be solid or otherwise prevent flows of gas through the sides/top/bottom of chassis 102, while not shown other ventilation portions may be present with chassis 102 to facilitate various desirable circulation patterns). Ventilation portion 104 may enable gasses to circulate through the interior of chassis 102. Refer to FIGS. 3-4 for additional details regarding ventilation portion 104.

Functional portion 106 and/or other functional portions (e.g., 108) may be reversibly secured to various portion of ventilation portion 104. These various functional portions may provide various functions for data processing system 100. For example, some functional portions (e.g., 106) may include filtration media to filter gasses that flow through portions of ventilation portion 104. In another example, function portions may facilitate expansion and/or changes in functionality of data processing systems 100 may include receptacles. These receptacles may enable attachment of displays, tags, and/or other structures to front side 110 (and/or other sides, depending on where ventilation portion 104 is positioned). When so attached, these components may enable hardware components 101 to display information to users/technicians of data processing system 100 (e.g., via a wire harness that may operably connected a display to hardware components 101), may enable information regarding the data processing system to be obtained from a tag (e.g., may be static, may be a radio frequency identification tag/other wireless tag with information regarding data processing system 100 stored thereon), etc. Refer to FIGS. 5-9 or additional information regarding functional portions.

While the aforementioned functional portions are attached to ventilation portion 104, various gas flows (e.g., 112) may still circulate through the interior of chassis 102. Example gas flows are shown in FIG. 2 using arrows with long dashed, wavy tails. Thus, as seen in FIG. 2, the presence of the functional portions may not prevent desired quantities of gasses from circulating to the interior of chassis 102 even while the functional portions as positioned with ventilation portion 104.

Turning to FIGS. 3 and 4, front and side view diagrams, respectively, illustrating ventilation portion 104 in accordance with an embodiment are shown. In FIGS. 3-4, only portions of ventilation are shown. The dashed lines near the edges of each figure illustrates that the structure may continue beyond the illustration shown in the figure.

To facilitate circulation of gasses into chassis 102, ventilation portion 104 may include any number of holes (e.g., 122) in a plate (e.g., 120). Plate 120 may be a structural member (e.g., include a plastic/metal plate). Plate 120 may include various features (not shown) that enable it to be attached to portion of chassis 102 (e.g., mounting holes, bolts, etc.). When so attached, plate 120 may restrict flows of gasses through the area in which plate 120 is positioned. The holes (e.g., 122) in plate 120 may enable gasses to traverse the are in which plate 120 is positioned. While described with respect to a plate, the structural member through which the holes are through may have other shapes without departing from embodiments disclosed herein. Additionally, while illustrated in FIGS. 3-4 as having a rectangular cross section, the holes may have other cross section shapes without departing from embodiments disclosed herein. Further, while shown as being arranged in a uniform grid, the holes may be distributed across ventilation portion 104 differently without departing from embodiments disclosed herein.

To provide for a variety of functions (e.g., noise suppression, prevention of debris flowing through the holes, improved aesthetic appeal, etc.), ventilation portion 104 may include various physical features. These features may include cover elements (e.g., 124) corresponding to all, or a portion, of the holes (e.g., 122) through plate 120. The cover elements 124 may, for example, cover all or a portion of the hole (e.g., at normal incidence to a plane in which the holes are positioned).

Each of the cover elements (e.g., 124) may include a cover member 128 and an offset member 126. Offset member 126 may be a structural element that separates cover member 128 from plate 120 and/or a corresponding hole. The distance of separation may be, for example, sufficient to (i) reduce airflow impedance through the corresponding holes to a predetermined amount (e.g., may be based on fans limits in chassis 102 and/or target airflow rates for cooling hardware components 101), (ii) based on the size of cover member 128 and coverage goals for the corresponding hole, and/or other factors.

Cover member 128 may be a structural element that covers (e.g., albeit offset from) a corresponding hole (e.g., covers when viewed from normal incidence or inline with the hole). Cover member 128 may have a similar shape to that of the corresponding hole, approximately the same size (e.g., larger or smaller by a prescribed amount, such as 5-10 percent), and/or may be of a different size and/or shape.

Generally, cover member 128 and offset member 126 may be fixedly attached to each other, and offset member 126 may be attached to plate 120. Consequently, forces applied to cover member 128 and offset member 126 may not result in deformation of these members unless the force applied is above a prescribed level. These prescribed levels of forces may be set based on the materials of which the members are composed, and the specific geometries (e.g., thicker may result in higher levels of prescribe forces). The prescribed levels of forces may be set so that, as will be discussed below, interferences between cover elements (e.g., 124) and functional portions will not be relieved unless a sufficiently large amount of force is applied to cause deformation of some of these elements/members. Consequently, when a functional portion is attached to ventilation portion 104, the functional portion may require intentional action for the functional portion to be removed.

While illustrated in FIGS. 3-4 as being pointed in a same direction (e.g., in FIG. 4, the offset member of each cover element is above the corresponding cover member), various cover elements 124 may be pointed in other directions. As will be discussed below, the directions of cover elements 124 may be set to established desired interferences with functional portions to retain the functional portions in desired positions with respect to ventilation portion 104.

For example, various groups of cover elements may be positioned around the exterior of ventilation portion 104 and may point outward. Such an arrangement may enable desirable interferences to be established.

Turning to FIG. 4, the positioning of ventilation portion 104 may, therefore, facilitate gas flow 112 to circulate gasses to the interior of chassis 102. Thus, the gasses may be used to thermally regulate the hardware components 101.

However, such gas flows may tend to carry particulates and/or other materials into the interior of chassis 102. Such materials may have undesirable impacts on hardware components 101 positioned in chassis 102.

Figure 5:
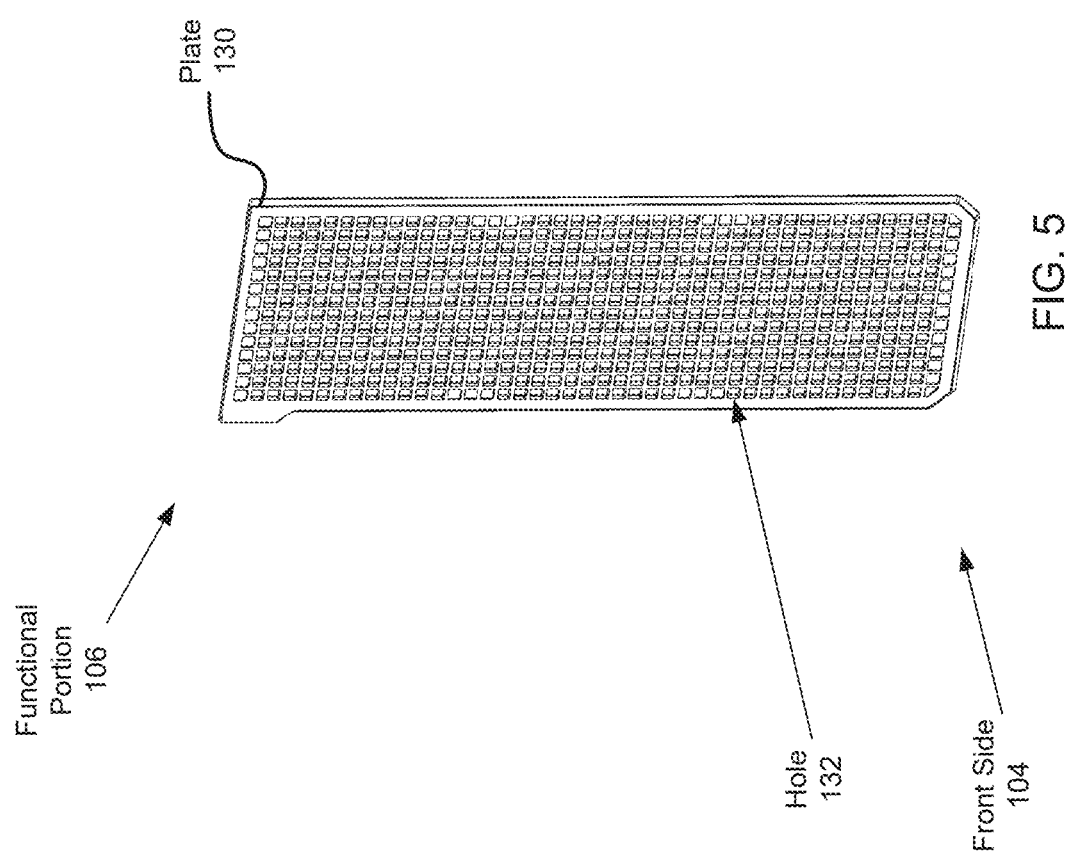
FIG. 5 shows a diagram illustrating a portion of a functional portion of a data processing system in accordance with an embodiment.
Figure 6:
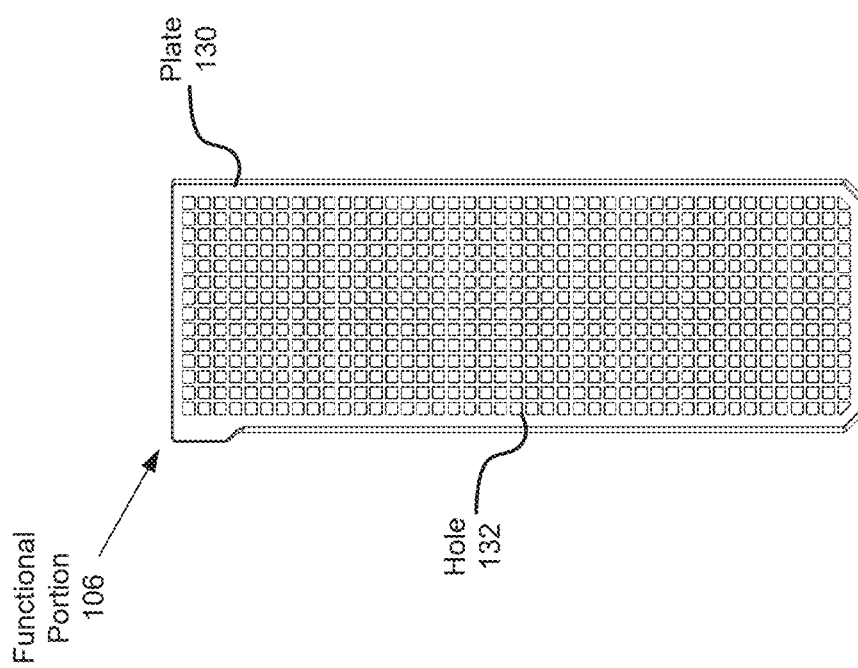
FIG. 6 shows a front view diagram illustrating a portion of a functional portion of a data processing system in accordance with an embodiment.
Figure 7:
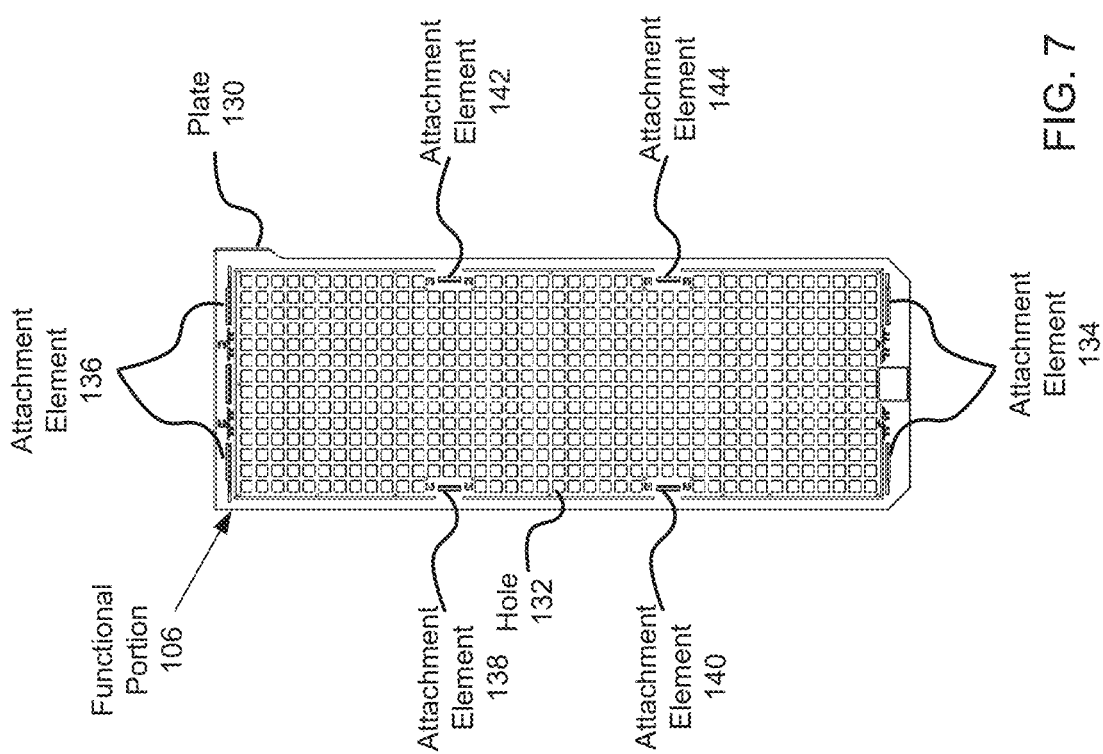
FIG. 7 shows a rear view diagram illustrating a portion of a functional portion of a data processing system in accordance with an embodiment.

Turning to FIGS. 5-7, isometric, front, and rear view diagrams, respectively, of functional portion 106 in accordance with an embodiment are shown.

Functional portion 106 may include any number of holes (e.g., 132) positioned in a body. The body may be a structural member such as a plate (e.g., 130). The holes 132 in functional portion 106 may corresponding to the holes (e.g., 122) in ventilation portion 104 such that gas flow paths through corresponding holes are established when functional portion 106 is secured to ventilation portion 104. While illustrated in a uniform grid, of same size, and square shape in these figures, the holes in functional portion 106 may be in other patterns, may be of other shapes/sizes, and/or may vary from those shown in these figures without departing from embodiments disclosed herein. While not shown in FIGS. 5-7, various filtration media may be positioned with the holes (e.g., 132) to filter the flows of gas. Consequently, gas flows may be less likely to deposit undesired materials in the interior of chassis 102.

Figure 8:
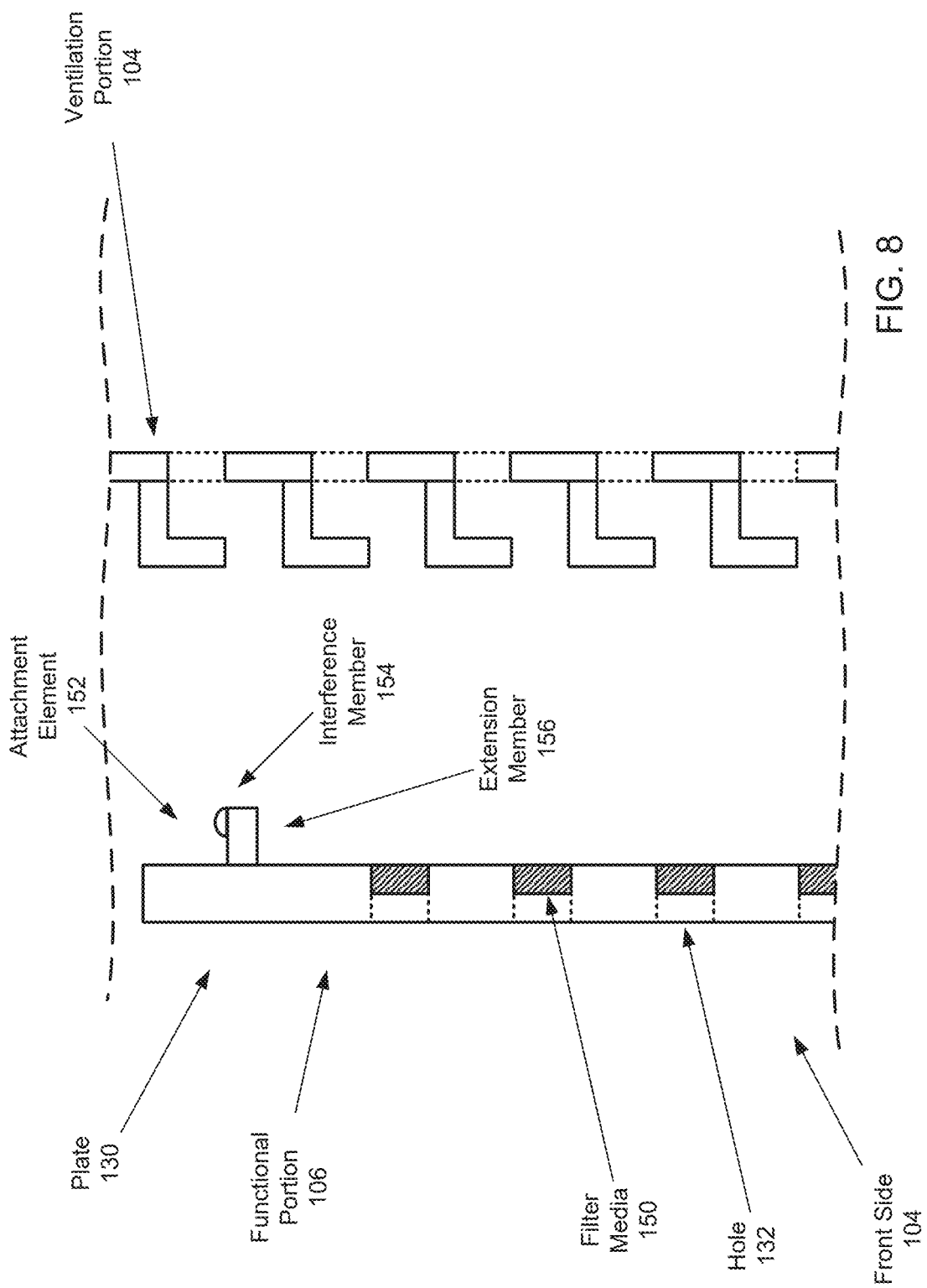
FIG. 8 shows a first side view diagram illustrating a portion of a functional portion and a ventilation portion of a data processing system in accordance with an embodiment.
Figure 9:
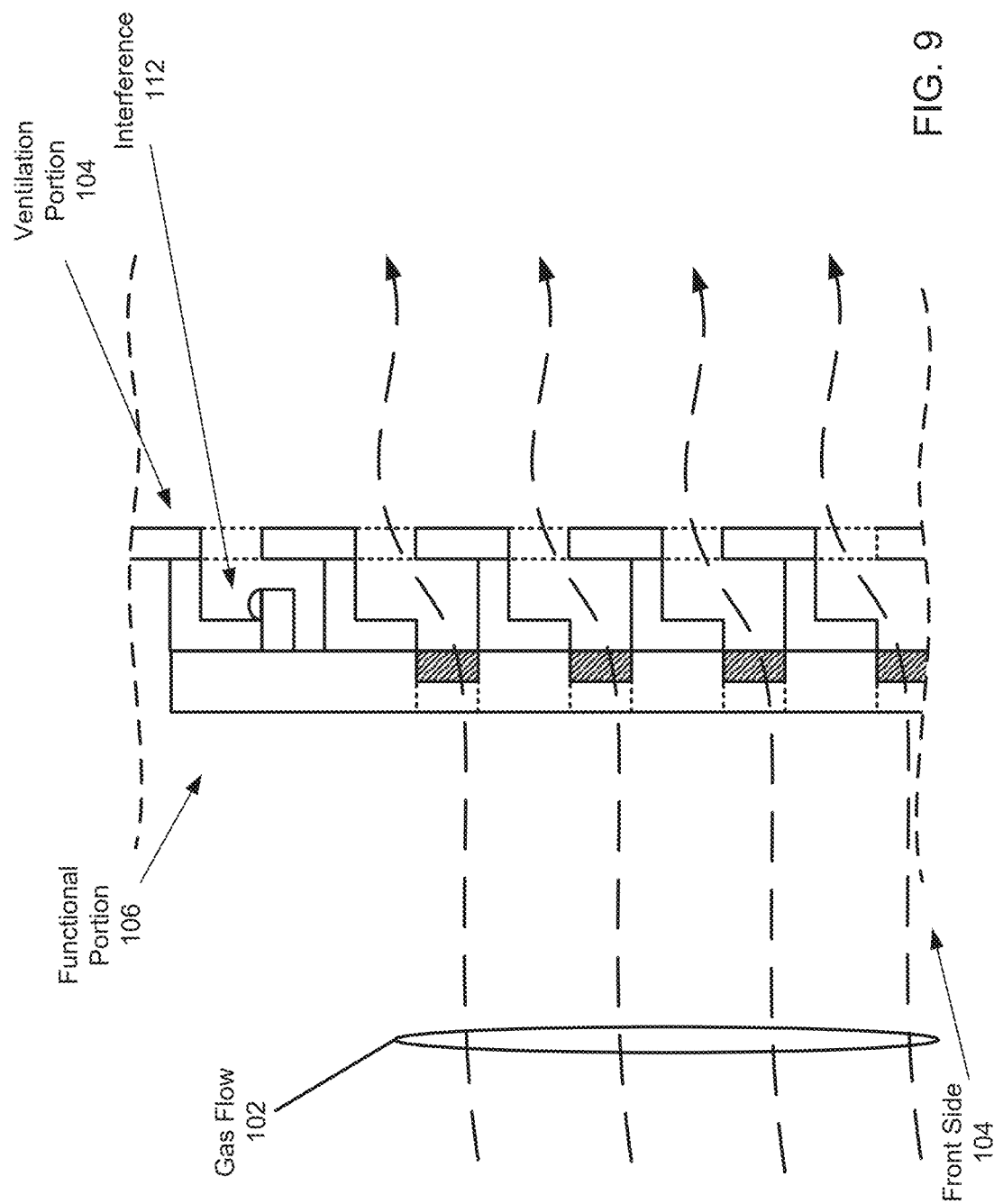
FIG. 9 shows a first side view diagram illustrating a portion of a functional portion and a ventilation portion of a data processing system in accordance with an embodiment.

To secure functional portion 106 to ventilation portion 104, functional portion 106 may include any number of attachment elements (e.g., 134, 138, 140, 142, 144). These attachment elements may have sizes, shapes, and be positioned so that they may establish interferences with some cover elements of ventilation portion 104. Refer to FIGS. 8-9 for additional details regarding the structure of attachment elements.

In an embodiment, attachment elements are positioned on a read side of plate 130 which is in contact with ventilation portion 104 when attached. The attachment elements may generally be positioned around a periphery of plate 130, and may be arranged with others in pairs. Each member of a pair may be on an opposite side of the plate. For example, attachment element 134 may pair with attachment element 142. Each pair may be positioned toward each other so that forces applied by the attachment elements of the pair oppose each other. Consequently, the forces applied by both members of each attachment element pair may need to be overcome to relieve interferences created by the attachment elements.

Generally, the attachment elements may be around a same width as one cover element, but may be larger. For example, as seen in FIG. 7, the attachment elements may have a same width as 2-3 cover elements (e.g., approximately the same size as the holes in functional portion 106.

Turning to FIGS. 8-9, side view diagrams of functional portion 106 and ventilation portion 104 in accordance with an embodiment are shown.

In FIG. 8, functional portion 106 is shown positioned near but not attached to ventilation portion 104. To secure functional portion 106 to ventilation portion 104, functional portion 106 may be moved to the right on the page toward ventilation portion 104. As seen in FIG. 8, attachment element 152 may include an extension member 156 and an interference member 154.

Extension member 156 may be a structural member extending from plate 130, and may be positioned complementary to a recess in ventilation portion 104. Attachment element 152 may be a structure member adapted to establish an interference with ventilation portion 104. In this example, interference member 154 may be a raised surface or other type of protrusion from extension member 156 that is unable to slide by a cover member of ventilation portion 104 when functional portion 106 is moved toward ventilation portion 104. However, is sufficient force is applied, extension member 156 and/or an offset member of ventilation portion 104 may deform to allow interference member 154 to pass by and allow plate 130 to seat with respect to ventilation portion 104. When so seated, the deformed members may return to their original shape thereby preventing movement of functional portion 106 with respect to ventilation portion 104.

For example, in FIG. 9, functional portion 106 is shown secured to ventilation portion 104. As seen from the figure, interference member 154 may prevent functional portion 106 from sliding away from ventilation portion 104, unless sufficient force is applied to allow for deformation of some members to allow the interference to be relaxed.

While so positioned, gas flow 112 may be established (e.g., as illustrated by the arrows with dashed, wavy tails). As seen in FIG. 9, the gas flow may be through the holes in functional portion 106 and the holes in ventilation portion 104. To prevent undesired materials from entering the chassis via gas flow 112, filter media 150 may be positioned with the holes in functional portion 106. In FIG. 9, the filter media is shown using the lined fill. While shown as partially filling the holes, it will be appreciated that the filter media may be formed as a thin film that may only be positioned on a rear ide of plate 130 and/or may only take up a small area within the holes (e.g., 132).

Additionally, as seen in FIG. 9, attachment elements of functional portion 106 may close or otherwise prevent gas flow through some holes of ventilation portion 104. For example, as seen, the hole proximate to attachment element 152 may effectively be sealed or closed off by attachment element 152, and/or the corresponding portion of plate 130 of functional portion 106.

While shown in FIGS. 3-9 with specific examples, it will be appreciated that the dimensions, relative sizes, and/or other characteristics of the components of functional portion 106 and/or ventilation portion 104 may differ from these examples without departing from embodiments disclosed herein.

While described with respect to filtration, it will be appreciated that functional portions may perform various functions, may be of different sizes than ventilation portions, and/or may be multi-component without departing from embodiments disclosed herein.

Figure 10:
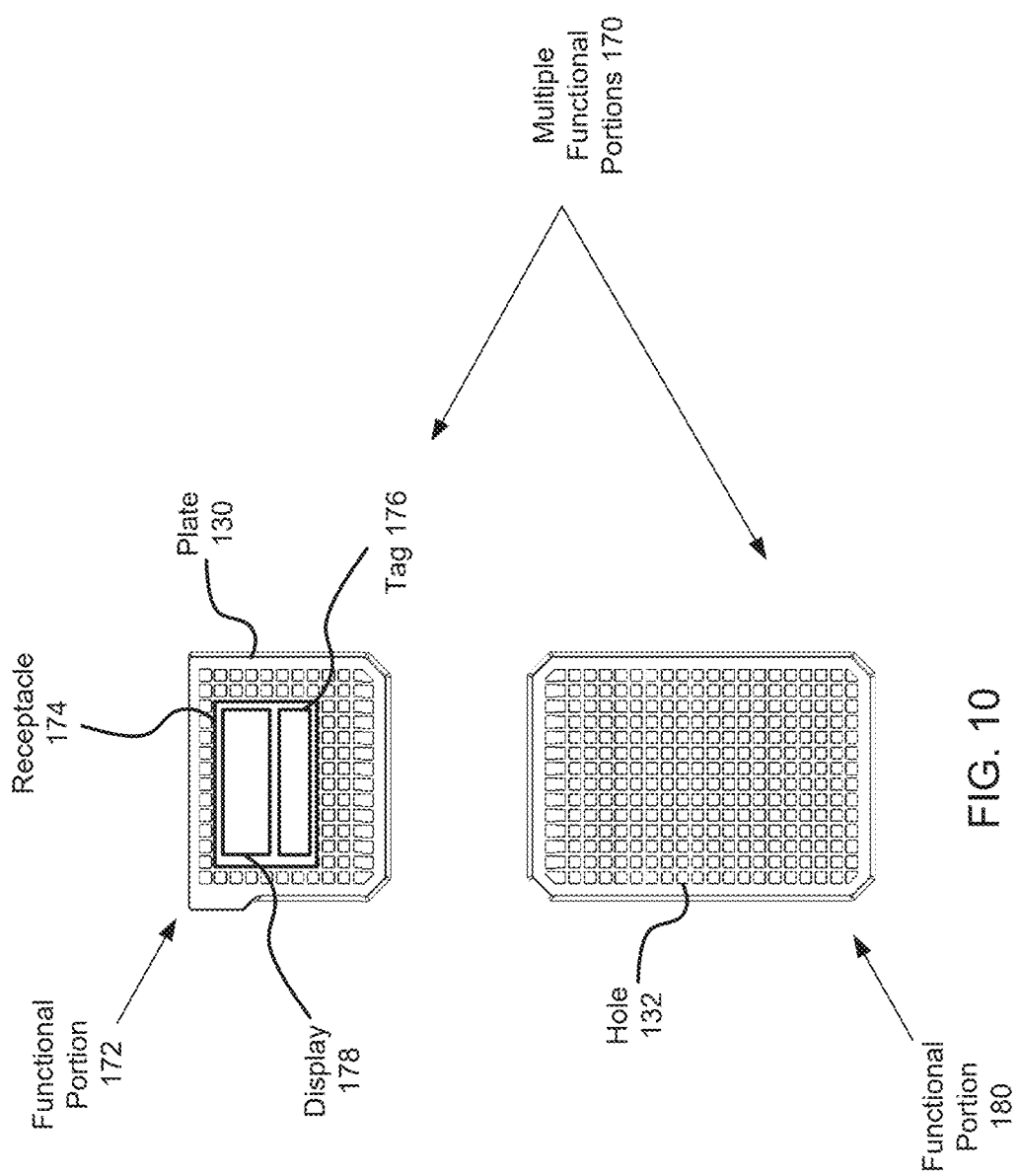
FIG. 10 shows a front view diagram illustrating an example multiple functional portion of a data processing system in accordance with an embodiment.

For example, turning to FIG. 10, a diagram of an example of multiple functional portions 170 in accordance with an embodiment is shown. The multiple functional portions may be adapted to attach to a single ventilation portion.

Each (e.g., 172, 180) of the multiple functional portions may perform similar or different functions. While shown in FIG. 10 with respect to two functions, it will be appreciated that multiple functional portions 170 may include any number of independent functional portions. Each independent functional portion may be separately secured to a ventilation portion.

For example, functional portion 180 may be similar to the functional portion described with respect to FIGS. 5-9, and may facilitate filtering of flows of gasses. However, in contract, functional portion 172 may both filter gasses and enable additional functionalities.

To enable the additional functionalities, functional portion 172 may include a receptacle 174 to which other components may be secured. For example, a display 178 and/or tag 176 may be secured to receptacle 174.

When so secured, a wire harness (not shown) and/or other structure for establishing an operable connection with the hardware components of the data processing system may be attached to the display. Consequently, the data processing system may display information (e.g., diagnostic) for use by users of the data processing system.

The tag (e.g., 176) may enable particular information to be provided. For example, tag 176 may be service tag which provides specific information (e.g., a globally unique identifier) when interrogated. Tag 176 may be implemented, for example, using a wireless tag (e.g., radio frequency identification), a physical tag, or another type of information carrying device.

The position of these components on the exterior of the chassis 102 of the data processing system may facilitate use of the data processing system. To facilitate the positioning, any of multiple functional portions 170 may include corresponding attachment elements, as discussed with respect to FIGS. 5-9.

Thus, the data processing system illustrated in FIGS. 1-10 may provide improved utility by, for example, improving the environment in the chassis of the data processing system, improving access to information usable to manage the data processing system, and/or may provide other benefits.

To facilitate use of a data processing system, the components of the data processing system may be assembled in a predetermined manner and/or disassembled.

Figure 11:
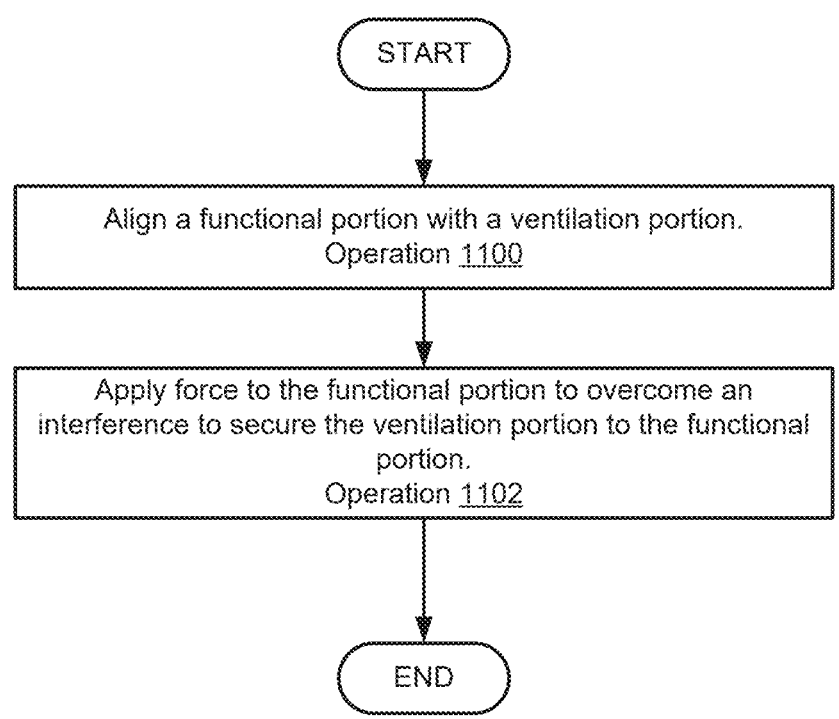
FIG. 11 shows a flow diagram illustrating a method in accordance with an embodiment.
Figure 12:
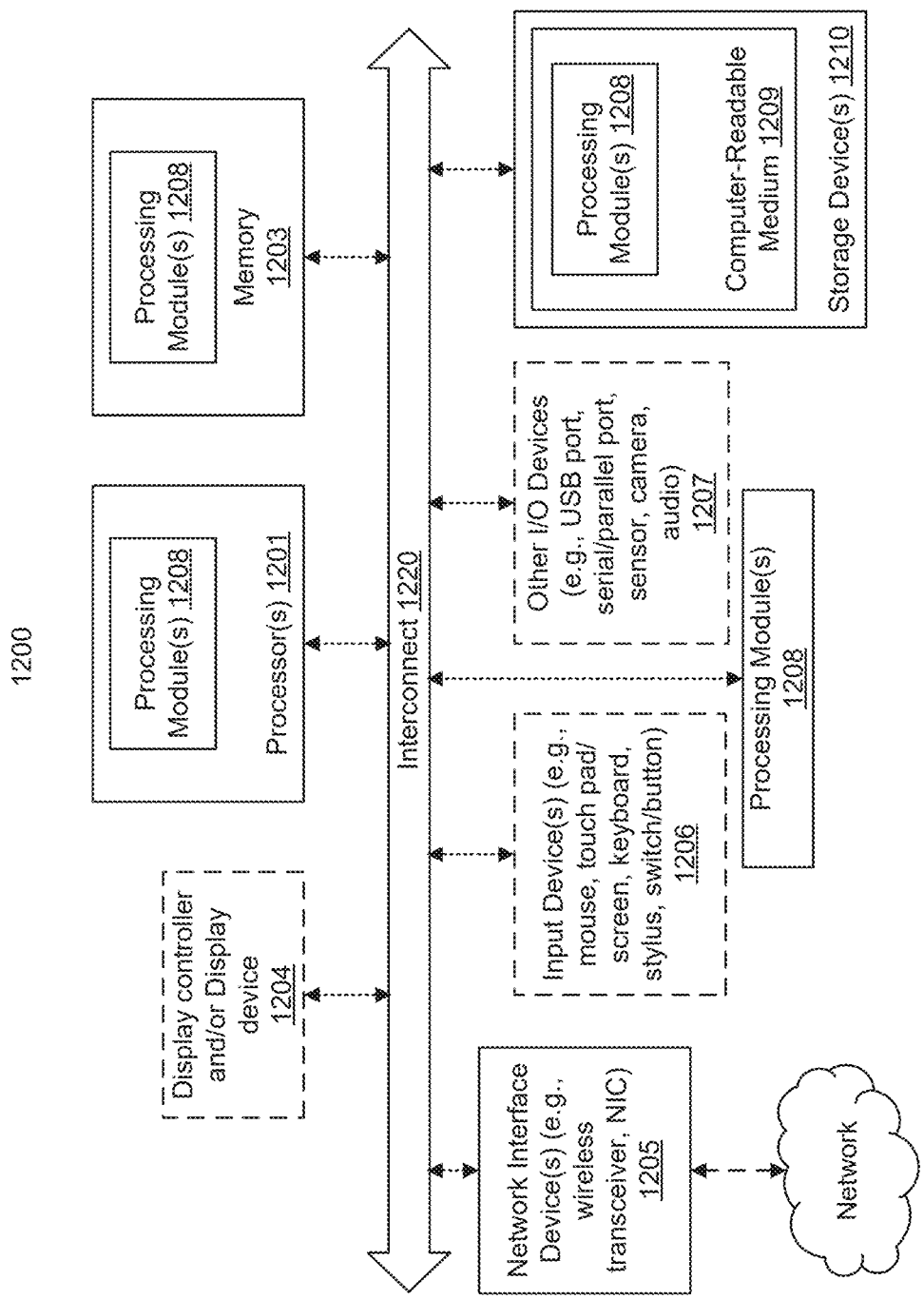
FIG. 12 shows a block diagram illustrating a data processing system in accordance with an embodiment.

Turning to FIG. 11, a flow diagram illustrating a method for assembling a data processing system in accordance with an embodiment is shown.

At operation 1100, a functional portion for a data processing system may be aligned with a ventilation portion of the data processing system. The functional portion may be aligned, for example, using the edges of the ventilation portion of the data processing system, using alignment guides, and/or via other methods. The alignment may place attachment elements in alignment with corresponding cover elements of the ventilation portion. The alignment may be performed by a technician or other person, or a mechanical system (e.g., a robot).

At operation 1102, force is applied to the functional portion to overcome an interference to secure the ventilation portion to the functional portion. The force may be directed toward a front side of the functional portion and toward the ventilation portion. The amount of force may be selected based on the amount needed to overcome the interference. When such force is applied, various portions of the functional portion and/or the ventilation portion may deform to relieve the interference. When so relieved, the functional portion may slide toward the ventilation portion. After sliding toward the ventilation portion, the deformed portions may return to their original shape. Consequently, the functional portion may be prevented from sliding or otherwise moving with respect to the ventilation portion. Accordingly, the two may be secured to each other. The force may be applied by a technician or other person, or a mechanical system (e.g., a robot).

The method may end following operation 1102.

The reverse process may be performed to disassemble the data processing system.

When so assembled, the hardware components may operate as a computing device. Turning to FIG. 4, a block diagram illustrating an example of a computing device (e.g., a data processing system) in accordance with an embodiment is shown. For example, system 1200 may represent any of data processing systems described above performing any of the processes or methods described above. System 1200 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1200 is intended to show a high level view of many components of the computer system. However, it is to be understood that additional components may be present in certain implementations and furthermore, different arrangement of the components shown may occur in other implementations. System 1200 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1200 includes processor 1201, memory 1203, and devices 1205-1207 via a bus or an interconnect 1220. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1201, which may be a low power multi-core processor socket such as an ultra-low voltage processor, may act as a main processing unit and central hub for communication with the various components of the system. Such processor can be implemented as a system on chip (SoC). Processor 1201 is configured to execute instructions for performing the operations discussed herein. System 1200 may further include a graphics interface that communicates with optional graphics subsystem 1204, which may include a display controller, a graphics processor, and/or a display device.

Processor 1201 may communicate with memory 1203, which in one embodiment can be implemented via multiple memory devices to provide for a given amount of system memory. Memory 1203 may include one or more volatile storage (or memory) devices such as random access memory (RAM), dynamic RAM (DRAM), synchronous DRAM (SDRAM), static RAM (SRAM), or other types of storage devices. Memory 1203 may store information including sequences of instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1200 may further include IO devices such as devices (e.g., 1205, 1206, 1207, 1208) including network interface device(s) 1205, optional input device(s) 1206, and other optional IO device(s) 1207. Network interface device(s) 1205 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1206 may include a mouse, a touch pad, a touch sensitive screen (which may be integrated with a display device of optional graphics subsystem 1204), a pointer device such as a stylus, and/or a keyboard (e.g., physical keyboard or a virtual keyboard displayed as part of a touch sensitive screen). For example, input device(s) 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1207 may include an audio device. An audio device may include a speaker and/or a microphone to facilitate voice-enabled functions, such as voice recognition, voice replication, digital recording, and/or telephony functions. Other IO devices 1207 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 1207 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1220 via a sensor hub (not shown), while other devices such as a keyboard or thermal sensor may be controlled by an embedded controller (not shown), dependent upon the specific configuration or design of system 1200.

To provide for persistent storage of information such as data, applications, one or more operating systems and so forth, a mass storage (not shown) may also couple to processor 1201. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 1201, e.g., via a serial peripheral interface (SPI). This flash device may provide for non-volatile storage of system software, including a basic input/output software (BIOS) as well as other firmware of the system.

Storage device 1210 may include computer-readable storage medium 1209 (also known as a machine-readable storage medium or a computer-readable medium) on which is stored one or more sets of instructions or software (e.g., processing module, unit, and/or processing module/unit/logic 1208) embodying any one or more of the methodologies or functions described herein. Processing module/unit/logic 1208 may represent any of the components described above. Processing module/unit/logic 1208 may also reside, completely or at least partially, within memory 1203 and/or within processor 1201 during execution thereof by system 1200, memory 1203 and processor 1201 also constituting machine-accessible storage media. Processing module/unit/logic 1208 may further be transmitted or received over a network via network interface device(s) 1205.

Computer-readable storage medium 1209 may also be used to store some software functionalities described above persistently. While computer-readable storage medium 1209 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 1208, components and other features described herein can be implemented as discrete hardware components or integrated in the functionality of hardware components such as ASICS, FPGAs, DSPs or similar devices. In addition, processing module/unit/logic 1208 can be implemented as firmware or functional circuitry within hardware devices. Further, processing module/unit/logic 1208 can be implemented in any combination hardware devices and software components.

Note that while system 1200 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system, comprising:
   hardware components that are adapted to provide computer implemented services and positioned in a chassis;
   the chassis comprising:
   a ventilation portion comprising:
   a plurality of ventilation holes to facilitate circulation of gasses through an interior of the chassis; and
   a plurality of cover elements positioned with the plurality of ventilation holes to at least partially cover the plurality of ventilation holes; and
   a functional portion comprising:
   a plurality of attachment elements adapted to:
   reversibly secure the functional portion to the ventilation portion; and
   align a portion of the functional portion with the ventilation portion.

2. The data processing system of claim 1, wherein an attachment element of the plurality of attachment elements is adapted to establish an interference with at least one cover element of the plurality of cover elements during a securement of the functional portion to the ventilation portion.

3. The data processing system of claim 1, wherein the functional portion further comprises:
   a plurality of holes corresponding to the plurality of ventilation holes; and
   filtration media positioned with the plurality of holes.

4. The data processing system of claim 3, wherein while the functional portion is secured to the ventilation portion, the filtration media filters flows of gasses through the plurality of ventilation holes.

5. The data processing system of claim 4, wherein while the functional portion is secured to the ventilation portion, the plurality of holes is offset from the plurality of ventilation holes with respect to airflow paths that the flows of gasses take when pathing through the ventilation holes.

6. The data processing system of claim 3, wherein the functional portion further comprises:
   a plate in which the plurality of holes is positioned,
   wherein the plurality of attachment elements are attached to the plate.

7. The data processing system of claim 6, wherein while the functional portion is secured to the ventilation portion, the plurality of attachment elements close a portion of the plurality of ventilation holes.

8. The data processing system of claim 7, wherein while the functional portion is secured to the ventilation portion, the plurality of attachment elements create interferences with a portion of the plurality of cover elements, the interferences preventing detachment of the functional portion of the ventilation portion without deformation of the plurality of attachment elements.

9. The data processing system of claim 1, wherein a cover element of the cover elements comprises:
   a cover member, and
   an offset member that separates the cover member from a corresponding ventilation hole of the plurality of ventilation holes.

10. The data processing system of claim 9, wherein the ventilation portion further comprises:
    a plate in which the plurality of ventilation holes is positioned,
    wherein the offset member is attached to the plate.

11. The data processing system of claim 10, wherein the offset member is aligned with the corresponding ventilation hole by the cover member so that the ventilation hole is not visible at normal incidence to the plate.

12. The data processing system of claim 11, wherein the offset member is separate from the plate by a distance defined by the offset member to enable gasses to flow around the cover member while flowing through a flow path through the ventilation hole.

13. The data processing system of claim 1, wherein the functional portion further comprises:
    a receptacle.

14. The data processing system of claim 13, wherein the functional portion further comprises:
    a display positioned in the receptacle and operably connected to the hardware components.

15. The data processing system of claim 13, wherein the functional portion further comprises:
    a tag, positioned in the receptacle, for managing the data processing system.

16. A chassis for housing hardware components that provide computer implemented services, the chassis comprising:
    a ventilation portion comprising:
    a plurality of ventilation holes to facilitate circulation of gasses through an interior of the chassis; and
    a plurality of cover elements positioned with the plurality of ventilation holes to at least partially cover the plurality of ventilation holes; and
    a functional portion comprising:
    a plurality of attachment elements adapted to:
    reversibly secure the functional portion to the ventilation portion; and
    align a portion of the functional portion with the ventilation portion.

17. The chassis of claim 16, wherein an attachment element of the plurality of attachment elements is adapted to establish an interference with at least one cover element of the plurality of cover elements during a securement of the functional portion to the ventilation portion.

18. The chassis of claim 16, wherein the functional portion further comprises:
    a plurality of holes corresponding to the plurality of ventilation holes; and
    filtration media positioned with the plurality of holes.

19. The chassis of claim 18, wherein while the functional portion is secured to the ventilation portion, the filtration media filters flows of gasses through the plurality of ventilation holes.

20. The chassis of claim 19, wherein while the functional portion is secured to the ventilation portion, the plurality of holes is offset from the plurality of ventilation holes with respect to airflow paths that the flows of gasses take when pathing through the ventilation holes.

* * * * *